(12) United States Patent
Lambert et al.

(10) Patent No.: US 11,861,658 B2
(45) Date of Patent: *Jan. 2, 2024

(54) SYSTEM AND METHOD FOR REDEEMING A REWARD

(71) Applicant: Capital One Services, LLC, McLean, VA (US)

(72) Inventors: Gregory Willard Lambert, Midlothian, VA (US); Philip John Spiegel, Midlothian, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 51 days.

This patent is subject to a terminal disclaimer.

(21) Appl. No.: 17/462,876

(22) Filed: Aug. 31, 2021

(65) Prior Publication Data

US 2021/0398167 A1 Dec. 23, 2021

Related U.S. Application Data

(63) Continuation of application No. 16/363,459, filed on Mar. 25, 2019, now Pat. No. 11,132,708, which is a continuation of application No. 11/232,257, filed on Sep. 20, 2005, now Pat. No. 10,242,382.

(51) Int. Cl.
*G06Q 30/02* (2023.01)
*G06Q 30/0251* (2023.01)

(52) U.S. Cl.
CPC ......... *G06Q 30/0251* (2013.01); *G06Q 30/02* (2013.01); *G06Q 30/0255* (2013.01); *G06Q 30/0254* (2013.01)

(58) Field of Classification Search
CPC .. G06Q 10/10; G06Q 30/0211; G06Q 20/023; G07F 7/025; G07G 1/0045
See application file for complete search history.

(56) References Cited

U.S. PATENT DOCUMENTS

| | | | |
|---|---|---|---|
| 6,018,718 A | 1/2000 | Walker et al. |
| 6,327,573 B1 | 12/2001 | Walker et al. |
| 6,434,534 B1 | 8/2002 | Walker et al. |
| 6,450,407 B1 | 9/2002 | Freeman et al. |
| 6,684,195 B1 | 1/2004 | Deaton et al. |
| 6,901,375 B2 | 5/2005 | Fernandez |
| 6,965,868 B1 | 11/2005 | Bednarek |
| 7,051,925 B2 | 5/2006 | Schwartz |
| 7,228,354 B2 | 6/2007 | Chambliss et al. |
| 7,401,032 B1 | 7/2008 | Golden et al. |
| 7,430,521 B2 | 9/2008 | Walker et al. |

(Continued)

*Primary Examiner* — Saba Dagnew
(74) *Attorney, Agent, or Firm* — TROUTMAN PEPPER HAMILTON SANDERS LLP; Christopher J. Forsnter; John A. Morrissett

(57) ABSTRACT

Systems and methods for redeeming a reward held by an individual are described. A method for redeeming a reward includes determining threshold criteria for provision of a targeted reward redemption offer, identifying at least one individual based upon the threshold criteria, determining the targeted reward redemption offer, and providing the targeted reward redemption offer to the identified individual. A response to the provided targeted reward redemption offer may be received, and an account of the identified individual may be adjusted in accordance with the targeted reward redemption offer and the received response.

20 Claims, 2 Drawing Sheets

(56) References Cited

U.S. PATENT DOCUMENTS

| | | |
|---|---|---|
| 7,437,330 B1 | 10/2008 | Robinson et al. |
| 7,571,139 B1 | 8/2009 | Giordano et al. |
| 8,226,418 B2 | 7/2012 | Lycas |
| 8,260,661 B2 | 9/2012 | Bortolin et al. |
| 8,380,568 B2 | 2/2013 | Kasireddy |
| 8,438,077 B2 | 5/2013 | Walker et al. |
| 2001/0014868 A1 | 8/2001 | Herz |
| 2002/0116266 A1* | 8/2002 | Marshall ............ G06Q 10/10 705/14.14 |
| 2002/0123965 A1 | 9/2002 | Phillips |
| 2002/0174011 A1 | 11/2002 | Sanchez et al. |
| 2003/0009379 A1 | 1/2003 | Narasimhan et al. |
| 2003/0032409 A1 | 2/2003 | Hutcheson |
| 2003/0061097 A1 | 3/2003 | Walker et al. |
| 2003/0074290 A1 | 4/2003 | Clore |
| 2003/0105689 A1 | 6/2003 | Chandak et al. |
| 2003/0171992 A1 | 9/2003 | Blagg et al. |
| 2003/0233278 A1 | 12/2003 | Marshall |
| 2003/0236712 A1 | 12/2003 | Antonucci et al. |
| 2004/0093271 A1 | 5/2004 | Walker et al. |
| 2004/0181480 A1 | 9/2004 | Greenberg et al. |
| 2004/0186770 A1* | 9/2004 | Pettit ............ G07G 1/0045 705/14.27 |
| 2004/0193489 A1 | 9/2004 | Boyd et al. |
| 2004/0249710 A1 | 12/2004 | Smith et al. |
| 2005/0004840 A1 | 1/2005 | Wanninger |
| 2005/0010472 A1* | 1/2005 | Quatse ............ G06Q 30/0211 705/14.13 |
| 2005/0015300 A1 | 1/2005 | Smith et al. |
| 2005/0021400 A1 | 1/2005 | Postrel |
| 2005/0033643 A1 | 2/2005 | Smith et al. |
| 2005/0133590 A1* | 6/2005 | Rettenmyer ............ G07F 7/025 235/493 |
| 2005/0144074 A1 | 6/2005 | Fredregill |
| 2005/0149394 A1 | 7/2005 | Postrel |
| 2005/0246289 A1* | 11/2005 | Alexander ............ G06Q 20/023 705/67 |
| 2006/0122921 A1 | 6/2006 | Comerford et al. |
| 2006/0224454 A1 | 10/2006 | Kantor et al. |
| 2007/0033097 A1 | 2/2007 | Woolford |
| 2007/0078719 A1 | 4/2007 | Schmitt et al. |
| 2008/0120155 A1* | 5/2008 | Pliha ............ G06Q 30/02 705/14.17 |
| 2008/0154726 A1 | 6/2008 | Bennett et al. |
| 2008/0249813 A1 | 10/2008 | Schmeyer |
| 2010/0192175 A1 | 7/2010 | Bachet et al. |

* cited by examiner

SYSTEM AND METHOD FOR REDEEMING A REWARD

CROSS REFERENCE TO RELATED APPLICATIONS

This application is a continuation of, and claims priority under 35 U.S.C. § 120 to, U.S. patent application Ser. No. 16/363,459, filed Mar. 25, 2019, which is a continuation of U.S. patent application Ser. No. 11/232,257, now U.S. Pat. No. 10,242,382, filed Sep. 20, 2005, the entire contents of which are fully incorporated herein by reference.

FIELD

The present application relates to systems and methods for redeeming a reward, and more particularly to systems and methods for redeeming a reward by determining an offer, providing the offer to an individual, and receiving a response to the offer.

BACKGROUND

Reward programs may be used as marketing devices to provide incentives to individuals to perform transactions using accounts, for example financial accounts. The reward programs may be managed by entities such as financial institutions. In a conventional reward program, a reward account of an individual is established and linked to or associated with a financial account to allow the individual to receive a type of benefit in exchange for using the financial account in performing transactions. The benefit may include reward units, such as reward points, and the reward units may be exchanged for goods and services, such as airline travel and consumer products offered by various merchants and service providers. A financial transaction card is commonly associated with the financial account and/or the reward account, and is provided to the individual to facilitate the performance of the transactions without requiring the use of cash or personal checks.

The number and variety of reward programs managed by entities has increased greatly, and the increased number of programs has in turn resulted in increased utilization of reward programs by individuals. For example, a large number of financial institutions presently offer and manage reward programs, and it is common for an individual to have multiple independent financial accounts each associated with a separate reward type or reward program. This increased participation in reward programs has led to the accumulation of large balances of reward units by a great number of individuals.

In conventional reward programs, the rewards may have a long or indeterminate duration, and may be maintained in the reward account until the individual elects to redeem them for goods and/or services. These accumulated balances of indeterminate duration may therefore result in large values of unused reward units being maintained for long periods of time, necessitating substantial effort and introducing uncertainty into accounting and financing programs of the entity. Furthermore, the unused value represents a claim against the entity and/or merchants for which the reward units may be exchanged, adding to the accounting and financing uncertainty associated with the large stores of unused reward units. Additionally, individuals holding reward units may forget about the accumulated reward units and therefore neglect to redeem them, resulting in an underutilization of reward program benefits and a decrease in satisfaction of the individuals.

Accordingly, a need exists for reward systems and methods that facilitate the redemption of rewards by individuals, and that offer additional mechanisms by which individuals may be encouraged to utilize reward program benefits.

SUMMARY

An aspect of the present application provides for a method for redeeming a reward held by an individual, comprising determining threshold criteria for provision of a targeted reward redemption offer, identifying at least one individual based upon the threshold criteria, determining the targeted reward redemption offer, providing the targeted reward redemption offer to the identified individual, receiving a response to the provided targeted reward redemption offer, and adjusting an account of the identified individual in accordance with the targeted reward redemption offer and the received response.

DETAILED DESCRIPTION

The exemplary embodiments of the present application relate to systems and methods for redeeming a reward. A method for redeeming a reward may include determining threshold criteria for provision of a targeted reward redemption offer, identifying at least one individual based upon the threshold criteria, determining the targeted reward redemption offer, and providing the targeted reward redemption offer to the identified individual. A response to the provided targeted reward redemption offer may be received, and an account of the identified individual may be adjusted in accordance with the targeted reward redemption offer and the received response.

Figure 1:
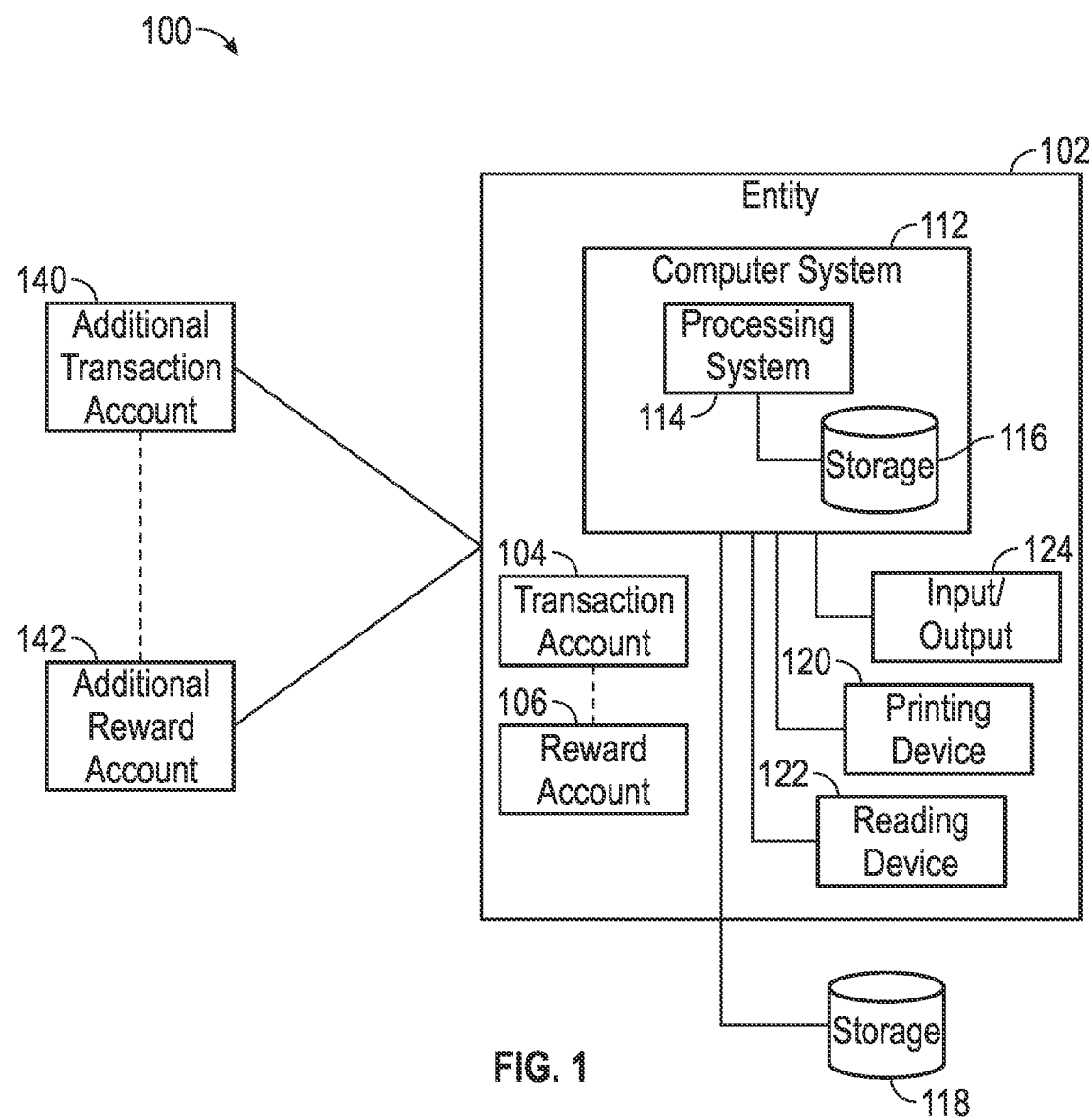
FIG. 1 shows an exemplary system for redeeming a reward according to the exemplary embodiments of the present application.

An exemplary reward redemption system 100 is shown in FIG. 1. The reward redemption system 100 may include an entity 102 and at least one transaction account 104. The entity 102 may provide various services, including maintaining accounts. In an exemplary embodiment, the reward redemption system 100 may be associated with a financial institution such as a bank, credit union, mortgage issuer, or a provider of financial services. The entity 102 may provide services to individuals through the transaction account 104, and the transaction account 104 may be associated with balances and/or lines of credit. The transaction account 104 may be associated with an individual, the individual typically being an identified principal holder of the account. In alternative embodiments, one or several entities may be associated with a single transaction account 104, including individual and enterprise entities. The entity 102 may include, for example, a bank, a brokerage, a mortgage company, a credit union, and a transaction card issuer, such as a credit card issuer. The entity 102 may additionally be responsible for facilitating payments for transactions performed by the individual. As will be appreciated by one skilled in the art, the term "account" may include any arrangement providing for dealings or services, and may include transactions involving items, services, persons, etc.

An exemplary reward redemption system 100 of the present application may include software programs and/or routines stored and executed, for example, by a computer system 112 of the entity 102, and the software programs and/or routines may include software programs and/or routines for performing communication with other computer systems in conjunction with computer communication hardware and software. Communication between computer systems may be performed via a public communication network, for example the Internet, or via a private communication network separate from and independent of a public communication network. The communication may be performed by utilizing communication methods and protocols including TCP/IP, FTP, SSH, WIFI, and the like.

The terms "computer system" and "network" as used herein may include a variety of combinations of fixed and/or portable computer hardware, software, peripherals, and storage devices. The computer system 112 may include a plurality of individual components that are networked or otherwise linked to perform collaboratively, or may include one or more stand-alone components. The hardware and software components of the computer system 112 of the present application may include and may be included within fixed and portable devices including desktop, laptop, server, personal digital assistant, tablet, smart phone, television, radio, and audio and video recording devices.

The computer system 112 of the entity 102 of the present application may further include a processing system 114, at least one internal storage device 116, at least one external storage device 118, at least one printing device 120, at least one reading device 122, and at least one input/output device 124. The storage devices 116, 118 may include devices for storing data electronically, such as hard drive devices, storage servers, storage-area networks, RAID configurations, optical media drives, holographic media drives, tape media drives, flash memory devices, and the like. The computer system 112 may also include computer system components including one or more random-access memory modules. The at least one input/output device 124 may additionally include one or more peripherals such as keyboards, mice, and monitors for enabling input and output of information to and from the computer system 112.

The software routines and/or programs may be embedded and/or stored in the internal storage device 116 or external storage device 118 and may be run by the processing system 114. Alternatively, the software routines and/or programs may be run by another computer system independent of entity 102, with output of the software routines and/or programs being accessed by processing system 114 and/or input/output device 124. The processing system 114 may run software applications including operating systems such as UNIX, Linux, BSD, OS/2, VMS, VAX, and Microsoft applications, as well as database applications, web server applications, file server applications, FTP server applications, mail server applications, and the like.

Additionally, the computer system 112 may be capable of network communication, and the networks over which the communication may be performed may include wired or wireless communication lines and associated hardware devices used in transmitting, receiving, and routing data, such as routers, switches, hubs, network interfaces, and the like.

The computer system 112 may also include software applications to allow it to function as a web server for delivering information via an Internet interface using sockets. The information transmitted by the web server may include web page information identified by universal resource locators ("URLs"), and formatted in Hypertext Markup Language ("HTML") or a similar formatting language in response to requests received via the Internet. The web page information may also include information formatted using Dynamic HTML ("DHTML"), Extensible Markup Language ("XML"), Java, JavaScript, and the like. Alternatively, the web server may be configured to provide information utilizing Wireless Access Protocol ("WAP") to a WAP-enabled device such as a cellular telephone, personal digital assistant ("PDA"), and the like.

Web server functions may be performed through utilization of web server software applications such as Apache, Netscape, and Microsoft web server applications in conjunction with Common Gateway Interface ("CGI") applications. The CGI applications may perform tasks related to receiving and sending data packets to other computer systems via communication networks, and may additionally perform communication with the database applications in accordance with information received from the communication networks. The CGI applications may include programs written, for example, using programming languages such as C, C++, C#, Java, Perl, Python, Ruby, BASIC, COBOL, and shell scripts. Additionally, the web server applications may incorporate or may be associated with data encryption applications including Secure Socket Layer ("SSL") and/or Transport Layer Security ("TLS") applications for providing endpoint authentication and communications privacy using cryptography, and secure shell ("SSH") applications for encrypted communications, tunneling, forwarding ports, and transferring data files. The web server applications may additionally provide web services, and the web services may be provided via private communication networks and/or public communication networks such as the Internet.

The database applications may be utilized to define, build, and manage databases, and the databases may be stored in internal storage devices 116 and/or external storage devices 118. The database applications may include relational database management systems, such as applications developed by Oracle, IBM, and the like.

Additionally, the computer system 112 may run information processing software modules, including modules for account establishment and management, confidential information collection, request reception and processing, information formatting and transmission, security monitoring, and report generation. As will be appreciated by those skilled in the art, the modules may be programmed using, for example, one or more of the programming languages identified above, and may be programmed to interact with and utilize the computer system communication and data processing hardware elements identified above.

A transaction card for performing transactions may be linked with transaction account 104. The transaction card may include, for instance, a credit card, a debit card, a reward card, a check card, a stored value card, and a smart card. Usage of the transaction card to perform transactions using the transaction account 104 may be performed electronically and may be facilitated by a mechanism such as a magnetic strip positioned on the transaction card or via a processing unit incorporated into the transaction card. Accordingly, the individual may use the transaction card to perform transactions, for example purchase transactions, through a merchant using funds or credit held in the transaction account 104.

The merchant may include a vendor having a physical store carrying an inventory of products and/or services for sale to individuals, or may include a virtual store presented in the form of a web page and usable by individuals via a communication network such as the Internet. Additionally, transaction card reading devices at merchant locations may read data encoded on the magnetic strip and/or data transmitted by the processing unit of the transaction card to identify the transaction account 104 associated with the transaction card, and the balance of the transaction account 104 may be adjusted in accordance with the transaction.

A merchant may utilize a transaction system that may be operable for performing transactions, for example purchases, sales, refunds, rebates, and the like involving products and/or services offered by the merchant. In an exemplary embodiment, the transaction system of a merchant may include a point of sale ("POS") terminal operable for reading the transaction card. Alternatively, each merchant transaction system may include an automated teller machine ("ATM"), a cash register, a transaction card reading device, a magnetic scanning device, an optical scanning device, and the like, and may include a display device and a printing device for presenting information to the individual performing the transaction. The performance of transactions involving purchases and sales of goods and services using transaction accounts and associated transaction cards is well known in the art, and therefore will not be described in detail herein.

To facilitate use of the transaction card in performance of transactions, a reward may be associated with a reward account 106, and the reward account may be linked or associated with the transaction account 104. The reward may include reward units, for example in the form of reward points or reward miles, and a balance of reward units may be maintained in the reward account 106. Reward units may be credited to and accrued by the individual, for example, when the transaction account 104 and/or transaction card is used at any number of merchants.

Reward units may be associated with a predetermined quantity or value of an incentive, promotion, benefit, or the like associated with the use of the transaction account 104 and/or the transaction card. In an exemplary embodiment, a quantity of reward unit may be associated with a value of a transaction performed using the transaction card and granted to the individual. For example, each dollar spent using the financial transaction account 104 and/or transaction card may correspond to one reward unit.

Reward units may be redeemable for discounts from a price of goods and/or services. Additionally, reward units may be redeemable for direct exchanges for goods and/or services. In an exemplary embodiment, for example, a reward unit associated with an airline service benefit may be associated with a predetermined number of miles of airline travel. The airline mile reward unit may accordingly be redeemable for travel vouchers or airline tickets issued by an airline affiliated with the entity 102. Many types of reward units may be utilized, and reward unit types may be differentiated by benefits offered through redemption of the reward units. For example, reward unit types may be linked to different types of merchants, industries, service providers, and the like, and the reward units may be redeemable in different forms including lodging units, airline miles, merchandise units, service units, gift certificates, cash, and the like.

Additionally, the individual may have at least one additional reward account 142, and the at least one additional reward account 142 may be associated with at least one additional transaction account 104. The additional reward account 142 and/or additional transaction account 140 may be managed by an entity independent of entity 102. Alternatively, the additional reward account 142 and/or additional transaction account 140 may be managed by entity 102. The additional reward account 142 may contain one or more rewards, for example in the form of reward units or points. The additional transaction account 140 and/or additional reward account 142 may be managed and utilized in a manner similar to the management and utilization of the respective transaction account 104 and/or reward account 106, as described below.

Exemplary embodiments of methods of the present application may include determining threshold criteria for reward provision, identifying an individual meeting the threshold criteria, determining a targeted reward redemption offer, providing the targeted offer to the identified individual, receiving a response to the targeted offer from the individual, and adjusting an account of the individual in accordance with the targeted offer and the received response.

Figure 2:
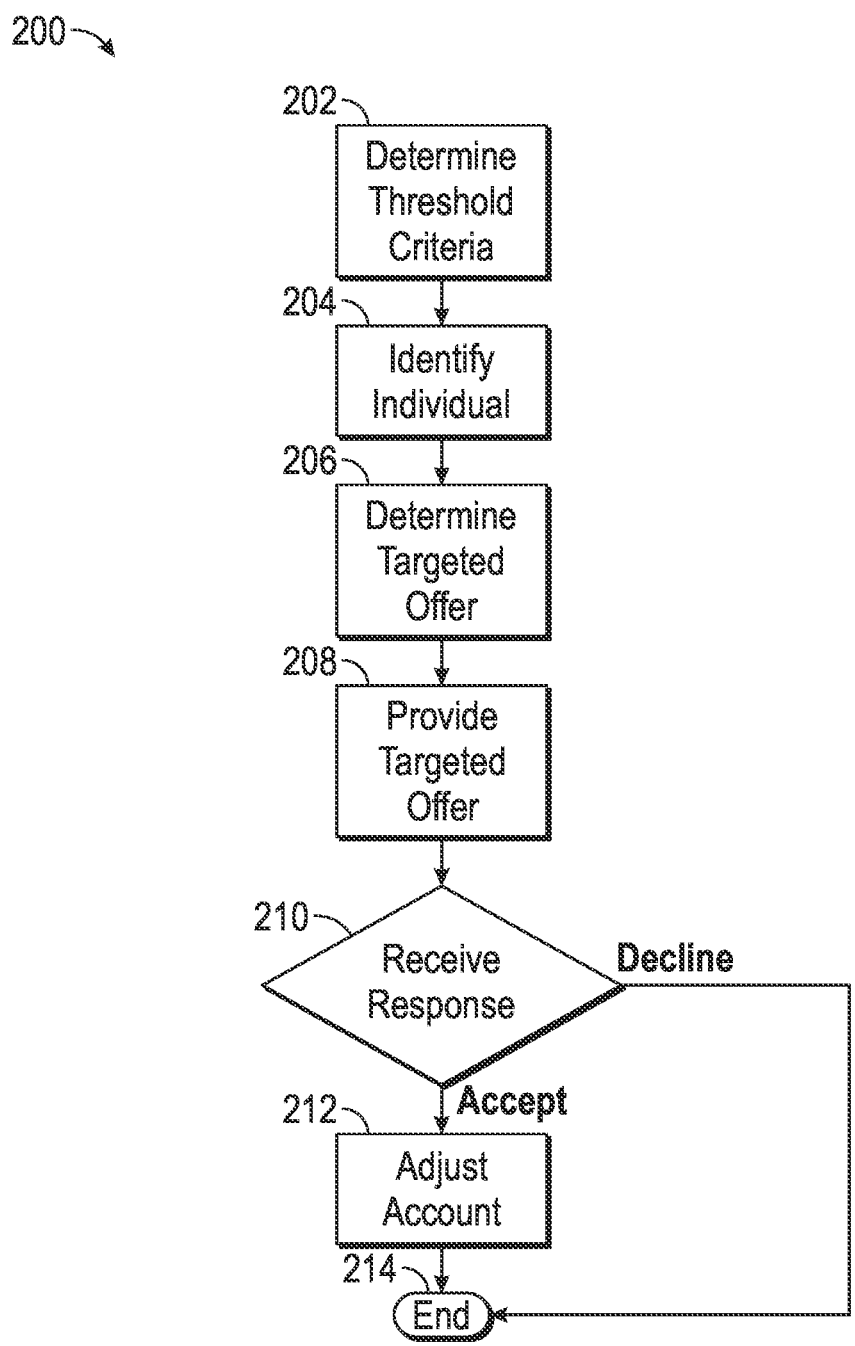
FIG. 2 is a flow diagram illustrating an exemplary method for redeeming a reward according to the exemplary embodiments of the present application.

Referring to FIG. 2, for example, threshold criteria may be determined at step 202. In an exemplary embodiment, the threshold criteria may include, for example, a threshold quantity of reward units which may be held in the reward account 106 and/or granted to at least one individual within a predetermined period of time. The threshold quantity of reward units may additionally include an average quantity of reward units and/or a median quantity of reward units. The threshold quantities of reward units may be measured and/or calculated at any suitable time, and may be calculated once or on a periodic, recurring schedule. The calculation may be performed, for example, at least once daily, weekly, monthly, quarterly, annually, and the like.

In an exemplary embodiment, determination of the threshold criteria may be performed in association with date information, for example information indicating a season or a time of year. The date information may be utilized to modify the threshold criteria to accommodate traditional consumer transaction and reward redemption behavior patterns. The threshold quantity of reward units may be adjusted in accordance with a date, for example, by increasing the threshold quantity of reward units determined during traditional vacation or holiday shopping periods associated with high levels of consumer activity. Similarly, the threshold quantity of reward units may be decreased during periods of low consumer activity, such as post-holiday shopping periods.

At least one individual meeting the threshold criteria may be identified at step 204. The determining of individuals may include parsing and searching of transaction history information, examination of a balance of transaction account 104, examination of a balance of reward account 106, and/or processing of other individual information. In an exemplary embodiment, the individual information may be located in one or more databases stored, for example, in internal storage device 116 and/or external storage device 118, and the one or more databases may contain individual transaction account information, reward account information, individual demographic information, and the like.

In an exemplary embodiment, for example, the one or more databases may contain at least one reward unit adjustment table, wherein all individual reward unit adjustments may be stored, such as reward units earned by the respective individual, reward units redeemed by the respective individual, effective dates of modification or status change of reward units of the respective individual, type and/or category of past redemptions of reward units of the respective individual, and other information related to the reward units held by and/or redeemed by individuals. The type and/or category of past redemptions may include, for example, a category of good and/or service for which the reward units were exchanged, such as cash, merchandise, air travel, services, gift card, charity, foreign locations, and the like.

The individual information stored in the one or more databases may include information associated with a plurality of individuals. The plurality of individuals may be associated with entity 102, for example, as accountholders of accounts managed by the entity 102. For example, the information stored for each respective individual may include one or more of an individual name, an individual address, an individual taxpayer identification number, individual preexisting account and associated financial entity information, individual reward account information, a credit limit of a transaction account of the individual, individual financial asset information, individual financial history information, individual employment information, and the like. Additional individual information may also be stored, for instance, information such as demographic information of each respective individual, a history of purchases by each individual of a type of product or service, a history of purchases by each individual at a particular merchant or branch retail locations of the merchant, a history of purchases by each individual in a geographical region, and the like. The demographic information of the individuals may include information related to individual age, sex, family status, and the like.

Additionally, the one or more databases may include transaction history archive information, such as historical records of each transaction performed by a respective individual, as well as information associated with transaction location, transaction merchant identifier, transaction merchant type, transaction item identifier, transaction item type, transaction time and/or date, and the like. The transaction history archive information may be categorized in several forms, for instance, by dividing the history archive information temporally or geographically, and indexing the divided information in tables or charts. In an exemplary embodiment, for example, the history archive information may be categorized into a monthly earning table, to include a record of activity on a monthly basis. The monthly earning table may be processed, for instance, to determine increased and/or decreased activity and patterns of transaction activity, which may in turn be utilized in determining a predicted probability of acceptance of a targeted offer.

In an exemplary embodiment, for instance, individuals determined to have, for example, at least the threshold quantity of reward units in their respective reward accounts may be identified for provision of a targeted reward redemption offer. Alternatively, individuals having an average and/or median quantity of reward units measured over a predetermined period of time may be identified for provision of a targeted offer. For instance, individuals having at least a predetermined monthly average balance or at least a predetermined quarterly average balance may be identified in step 204.

Information associated with lengths of time of holding of the reward units may also be processed during the identification of step 204. In an exemplary embodiment, for example, a cumulative and/or average period of time elapsed measured from a grant of the reward units may be utilized, and the threshold quantity of reward units may be adjusted in accordance therewith. For instance, the threshold quantity of reward units may be determined as described above, and thereafter reduced by a factor corresponding to an average holding period of the reward units in reward account 106 of the individual. The threshold quantity may be, for example, divided, multiplied, or otherwise arithmetically adjusted by an average holding period of the reward units held by the individual, and the resulting value may be utilized in determining whether the individual may be provided with a targeted offer. Alternatively, a coefficient or other numerical factor may be calculated, and processed to adjust the threshold quantity of reward units in identification of the at least one individual. Utilization of the information associated with lengths of time of holding of the reward units may be used in this manner to adjust the threshold criteria, for example, to attribute lower and/or more easily-attainable criteria values to longer-held balances of reward units, to effect a greater to individuals which hold the reward units for various periods of time.

Other information associated with each respective individual may be utilized and/or processed to adjust the threshold criteria used during identification of the at least one individual. In alternative exemplary embodiments, for example, individual transaction history information, individual transaction frequency information, information associated with lengths of time between transactions of the individual, information associated with average and/or median transaction values of the individual, individual transaction location information, transaction account 104 and/or reward account 106 establishment date information, individual demographic information, and individual financial asset information may be utilized to adjust the threshold criteria and/or may be utilized as additional threshold criteria factors.

In an exemplary embodiment, for example, transaction history information may be processed during the identification of step 204. Individuals having purchased items within predetermined classes and/or types of goods may be identified as suitable for provision of a targeted offer. Similarly, individuals having a history of transactions performed within predetermined geographical areas, at predetermined merchants, and/or within predetermined periods of time may be identified as suitable for provision of a targeted offer.

Additionally, expiration information associated with the reward units may be processed. In an exemplary embodiment, for example, expiration conditions of the reward units may be identified and processed, and individuals may be ranked and/or categorized in accordance with a relative quantity of reward units that may be near a time of expiration and/or that may be subject to other conditions regarding possible redemption of the reward units. The expiration information may be processed, for example, in the identification of individuals having reward units that will soon expire, or which have already expired at the time of the identification processing. Individuals having a relatively high number of reward units which will soon expire may not be identified for provision of targeted offers, as they will have a short period of time within which to act in accordance with the offer, or because the expected expiration would eliminate their reward units from consideration. For instance, individuals having reward units which will expire within a predetermined period of time, such as six months, may not be identified for provision of the targeted offer.

The processing of the expiration information associated with the reward units may also include demographic information and information associated with transactions, spending patterns and/or behavior of the individuals, as described above. In an exemplary embodiment, for instance, transaction history information individuals having reward units expiring in a relatively short time may be processed to determine a relative likelihood that the individual may redeem the reward units prior to expiration.

Additionally, the identification processing of step 204 may include scoring and/or ranking of individuals in accordance with a predicted probability that the respective individuals will elect to accept a targeted offer if a targeted reward redemption offer is provided. In an exemplary embodiment, for instance, individuals having a transaction history including purchases of a particular type of good or purchases of goods within a particular class of goods may be assigned a relatively high probability of acceptance of a targeted offer involving similar goods. The relative probability processing may additionally include individual demographic information, individual geographic information, individual wealth information, and the like, as described above.

The threshold criteria and values of additional information used to adjust the threshold criteria as described above may be modified at any time, for example to accommodate seasonal patterns, changing business conditions, variations in individual demographics and/or spending and transaction activity, and the like.

At least one targeted reward redemption offer may be determined and associated with at least one identified individual at step 206. The targeted offer may include, for example, an offer inviting the identified individual to exchange a predetermined quantity of reward units for a predetermined good and/or service. The targeted offer may be associated with a predetermined type and/or category of good or service, and may additionally be associated with a predetermined merchant or chain of merchant, a predetermined type of merchant, a predetermined geographical area, and the like. The targeted offer may be limited in duration, or may be indefinite in duration. The targeted reward redemption offer may be specifically directed to and acceptable only by the identified individual, or may be anonymous and acceptable by any individual possessing it. A targeted offer may be provided to a plurality of identified individuals that have common characteristics, or each reward offer may be determined individually.

In an exemplary embodiment, for example, the one or more targeted offer may be limited to a particular type of good and/or service, such as airline travel. Targeted reward redemption offers may be determined based upon geographical distribution of transactions, or upon demographic information associated with residence of the individual.

The targeted reward redemption offers may be determined based upon a quantity of a balance of reward units determined in step 204. In an exemplary embodiment, for instance, a targeted reward redemption offer associated with goods and/or services having a high cost may be determined for identified individuals having relatively large balances of reward units. Similarly, targeted offers associated with goods and/or services having "luxury" or "status" connotations may be determined for identified individuals having relatively large balances of reward units. Likewise, targeted reward redemption offers associated with goods and/or services having a low cost may be determined for identified individuals having relatively low balances of reward units.

The determination of the targeted reward redemption offer may include processing to ascertain a probability and/or likelihood of acceptance of the targeted offer by the identified individual. In an exemplary embodiment, for instance, the probability of acceptance of the targeted offer may be determined based upon the identified individual's transaction history, redemption history, and/or any of the individual information described above. The characteristics of the targeted offer may then be adjusted in accordance with the determined probability of acceptance. For instance, an individual associated with a transaction history including a particular type of good, or transactions having been performed within a particular season or geographical area may be determined to have a higher probability of acceptance of a targeted reward redemption offer associated with similar goods, seasons, or within similar geographical areas.

The at least one targeted reward redemption offer may be provided to the identified individual at step 208. The provision of the targeted reward redemption offer may include, for example, delivery of a paper document and/or coupon transmitted via postal mail. Alternatively, the targeted reward redemption offer may be included within an electronic document and/or other electronic communication transmitted via email or other suitable electronic communication mechanism.

In an exemplary embodiment, the targeted reward redemption offer may be in the form of a coupon redeemable for predetermined goods and/or services at one or more merchants, as described above. The targeted reward redemption offer may contain instructions associated with a manner of acceptance of the offer, and/or of the quantity of reward units that may be redeemed upon acceptance of the targeted reward redemption offer.

In an alternative exemplary embodiment, the targeted reward redemption offer may include a transaction card in the form of a gift card and/or stored value card. The transaction card may be usable, for instance, at a merchant to obtain goods and/or services upon presentation of the transaction card in exchange for a predetermined number of reward units associated with the targeted offer. The transaction card may also be usable at an ATM, POS terminal, and the like. In an alternative exemplary embodiment, the targeted reward redemption offer may include a check redeemable at a financial institution for cash, and the quantity of cash associated with the offer may be associated with an equivalent value of reward units. Alternatively, the targeted offer may include a good delivered directly to the identified individual.

Receipt of a response to the targeted reward redemption offer may be received at step 210, and the response may include an express acceptance or an express rejection by the identified individual. In an exemplary embodiment, the acceptance may include an express acknowledgement transmitted by the identified individual in the form of an express redemption acceptance, for example by signing an acceptance form, via telephone communication, via facsimile, via electronic mail, via SMS, via a software application presented on a web page, and the like.

In an alternative exemplary embodiment, acceptance of the targeted offer may be inferred from confirmation of an action performed by the individual in accordance with the targeted reward redemption offer, for example, a deposit of targeted reward redemption offer check and/or usage of a targeted offer transaction card at a merchant. In an exemplary embodiment, for instance, the targeted reward redemption offer may include a coupon inviting and/or instructing the identified individual to redeem a predetermined quantity of reward units for a good, service, and/or cash. The targeted offer may also include an indication that the coupon may be used by the individual by presentation of the coupon at a merchant, financial entity, and the like. Upon presentation of the coupon in accordance with the indication included in the targeted offer, the merchant, financial entity, and the like may then transmit an notice to the entity 102 that the individual has redeemed the targeted offer.

In an alternative exemplary embodiment, the targeted reward redemption offer may include a transaction instrument in an inactive state, for example a transaction card, check, coupon, and the like. The instrument may be unredeemable by the identified individual until the individual takes affirmative action to communicate an explicit acceptance of the targeted reward redemption offer. For example, the affirmative action may include a telephonic, postal, facsimile, SMS, or electronic communication to indicate the individual's desire to accept the targeted reward redemption offer.

In an another alternative exemplary embodiment, the targeted reward redemption offer may include a predetermined finite allowable acceptance time limit, and an indication and/or instruction that acceptance of the targeted reward redemption offer must be performed within the predetermined allowable acceptance time. If an acceptance of the targeted reward redemption offer that includes an allowable acceptance time is not performed before the expiration of the allowable acceptance time, the targeted offer may expire and the process may proceed to end at step 220. Alternatively, the targeted offer may include instructions indicating actions to be taken to transmit an express rejection of the targeted offer. Upon rejection of the targeted reward redemption offer by express rejection or by declining to affirmatively respond, the process may proceed to end at step 220.

Upon receipt of an acceptance of the targeted reward redemption offer as described above, the reward unit balance of the identified individual may be adjusted in accordance with the terms of the targeted reward redemption offer at step 212. The adjustment may include deducting and/or removing reward units from the reward account 106, in a quantity corresponding to the terms of the targeted offer. Adjustment associated with a targeted reward redemption offer including a transaction card and/or a check may include calculation of an equivalent cash value of reward units, the cash value being associated with the quantity of cash received by the accepting individual, and the deduction and/or removal of reward units in a quantity associated with the value of the calculated equivalent cash value.

The embodiments described above are illustrative examples of the present application and it should not be construed that the present application is limited to these particular embodiments. Various changes and modifications may be effected by one skilled in the art without departing from the spirit or scope of the application as defined in the appended claims.

It should be understood that the present application is not limited to the precise exemplary embodiments described herein and that various changes and modifications may be effected by one skilled in the art without departing from the spirit or scope of the application. For example, elements and/or features of different illustrative embodiments may be combined with each other and/or substituted for each other within the scope of the present disclosure and the appended claims. In addition, improvements and modifications which become apparent to persons of ordinary skill in the art after reading the present disclosure, the drawings, and the appended claims are deemed within the spirit and scope of the present application.

What is claimed is:

1. A system for facilitating reward redemption, comprising:
   a non-transitory storage medium storing instructions; and
   a processor in communication with the non-transitory storage medium, the processor, when executing the instructions, is configured to:
   calculate an individualized dynamically adjusted threshold, the individualized dynamically adjusted threshold indicating a threshold quantity of reward units held within a predetermined period of time in order to participate in a reward redemption program, wherein a reward is associated with a reward account, the reward includes reward units in a form of reward points or reward miles, and a balance of reward units are maintained in the reward account;
   identify at least one customer of a plurality of customers that meets the individualized dynamically adjusted threshold by searching at least one database comprising account information of each customer of the plurality of customers and by determining whether respective reward units associated with each customer of the plurality of customers will expire within a predetermined period of time, and the individualized dynamically adjusted threshold being adjusted based on one or more types of customer transaction information, wherein the at least one database comprising transaction history archive information corresponding to one or more patterns of transaction activity of the identified at least one customer;
   determine a probability of acceptance by the identified at least one customer based on the transaction history archive information of the at least one customer;
   adjust a reward redemption offer based on the probability of acceptance;
   send the reward redemption offer to the identified at least one customer;
   receive a response indicating an acceptance by the identified at least one customer of the reward redemption offer; and
   update account information of the identified at least one customer based on the reward redemption offer and the received response.

2. The system of claim 1, wherein the one or more types of customer transaction information comprise one or more of a length of time of holding the reward units by each customer, transaction history data of each customer, customer transaction frequency information, information associated with lengths of time between transactions of each customer, information associated with average and median transaction values of each customer, customer transaction location information, transaction account and reward account establishment date information, customer demographic information, customer financial asset information, or combinations thereof.

3. The system of claim 2, wherein the transaction history data of each customer comprises at least one of transaction item identifier information, transaction item type information, transaction merchant identification information, transaction merchant type information, transaction date information, transaction time information, transaction location information, transaction value information, transaction frequency information, and reward holding period information.

4. The system of claim 1, wherein the processor calculates the individualized dynamically adjusted threshold based on one or more factors including an average quantity of reward units, a median quantity of reward units and date information, wherein the date information includes one or more of the following: one or more time periods of levels of consumer activity, a periodic, recurring schedule and a shopping season.

5. The system of claim 1, wherein the processor determines the reward redemption offer based on at least the individualized dynamically adjusted threshold, levels of consumer activity, geographical distribution of transactions and/or demographic information associated with the plurality of customers.

6. The system of claim 1, wherein the processor transmits, via a network, an electronic communication to a device, wherein the electronic communication comprises the reward redemption offer in an inactive state.

7. The system of claim 6, wherein the processor receives, via the network, a response from the device, wherein the response indicates an acceptance of the reward redemption offer confirming that the identified at least one customer has redeemed the reward redemption offer at a merchant system.

8. The system of claim 1, wherein the processor determines a reward account of the identified at least one customer associated with a transaction account, and adjusts the reward account of the identified at least one customer in accordance with the reward redemption offer and the received response.

9. The system of claim 1, wherein the transaction history archive information is categorized by:
dividing the transaction history archive information temporally or geographically;
indexing the divided information in one or more tables or charts; and
processing the one or more tables or charts to determine the one or more patterns of transaction activity in determining the probability of acceptance of the reward redemption offer.

10. A system for facilitating reward redemption, comprising:
a non-transitory storage medium storing instructions; and
a processor in communication with the non-transitory storage medium, the processor, when executing the instructions, is configured to:
calculate, based on account information of a customer of a plurality of customers stored in at least one database, a dynamically adjusted threshold quantity of reward units held within a predetermined period of time in order to participate in a reward redemption program, the dynamically adjusted threshold being calculated based on one or more individualized details, a reward associated with a reward account, the reward including reward units in a form of reward points or reward miles, and a balance of reward units maintained in the reward account;
determine that the customer meets the dynamically adjusted threshold quantity of reward units by determining whether respective reward units associated with the customer will expire within a predetermined period of time;
determine a probability of acceptance of a reward redemption offer by the customer based on transaction history data, transaction history archive information, and redemption history of the customer, wherein the transaction history archive information corresponds to one or more patterns of transaction activity of;
adjust the reward redemption offer based on the probability of acceptance;
send the reward redemption offer to the customer after determining that the customer meets the dynamically adjusted threshold quantity of reward units;
receive a response indicating an acceptance by the customer of the reward redemption offer; and
update account information of the customer based on the reward redemption offer and the received response.

11. The system of claim 10, wherein the one or more individualized details comprise one or more of a length of time of holding the reward units by each customer of the plurality of customers, transaction history data of each customer of the plurality of customers, customer transaction frequency information, information associated with lengths of time between transactions of each customer of the plurality of customers, information associated with average and median transaction values of each customer of the plurality of customers, customer transaction location information, transaction account and reward account establishment date information, customer demographic information, customer financial asset information, or combinations thereof.

12. The system of claim 10, wherein the processor calculates the dynamically adjusted threshold based on one or more factors including an average quantity of reward units, a median quantity of reward units and date information, wherein the date information includes one or more of the following: one or more time periods of levels of consumer activity, a periodic, recurring schedule and a shopping season.

13. The system of claim 10, wherein the processor determines the reward redemption offer based on at least the dynamically adjusted threshold, levels of consumer activity, geographical distribution of transactions and/or demographic information associated with the customer.

14. The system of claim 10, wherein the transaction history archive information is categorized by:
dividing the transaction history archive information temporally or geographically;
indexing the divided information in one or more tables or charts; and
processing the one or more tables or charts to determine the one or more patterns of transaction activity in determining the probability of acceptance of the reward redemption offer.

15. The system of claim 10, wherein the processor transmits, via a network, an electronic communication to a device, wherein the electronic communication comprises the reward redemption offer in an inactive state.

16. The system of claim 15, wherein the processor receives, via the network, a response from the device, wherein the response indicates an acceptance of the reward redemption offer confirming that the customer has redeemed the reward redemption offer at a merchant system.

17. The system of claim 10, wherein the processor determines a reward account of the customer associated with a transaction account, and adjusts the reward account of the customer in accordance with the reward redemption offer and the received response.

18. A computer-implemented method for improved timing of a personalized targeted reward redemption offer to an individual based on reward units held by the individual, comprising:
receiving account holder information associated with a plurality of individuals transmitted by external systems via a network, the account holder information including transaction history data;
determining, using a processor, dynamic threshold criteria, wherein the dynamic threshold criteria includes a threshold quantity of reward units held by one or more individuals within a predetermined period of time that entitle the one or more individuals to participate in a targeted reward redemption program, wherein a reward is associated with a reward account, the reward includes reward units in a form of reward points or reward miles, and a balance of reward units are maintained in the reward account;

parsing the account holder information, using the processor, to identify the one or more individuals that meet the dynamic threshold criteria based on the account holder information for each respective individual, each dynamic threshold criteria being determined based on one or more individualized details wherein the processor identifies the one or more individuals by searching at least one database containing information associated with the one or more individuals using the dynamic threshold criteria and by determining whether respective reward units associated with the one or more individuals will expire within a predetermined period of time, the at least one database also containing transaction history archive information comprising one or more patterns of transaction activity;

determining, using the processor, a targeted reward redemption offer based on at least the dynamic threshold criteria;

determining, using the processor, a probability of acceptance of the targeted reward redemption offer for each of the one or more individuals based on at least the one or more patterns of transaction activity;

calculating a score for each of the one or more individuals based on each respective probability of acceptance;

ranking the one or more individuals based on at least the score;

determining a first individual of the one or more individuals with the highest rank;

adjusting, using the processor, the targeted reward redemption offer based on a respective probability of acceptance of the first individual;

transmitting, using the processor via a network, an electronic communication to a device, wherein the electronic communication comprises the targeted reward redemption offer in an inactive state;

receiving, at the processor via the network, a response from the device, wherein the response indicates an acceptance of the targeted reward redemption offer confirming that the first individual has redeemed the targeted reward redemption offer at a merchant system;

determining, via the processor, a reward account of the identified individual associated with a transaction account; and adjusting, via the processor, the reward account of the identified individual in accordance with the targeted reward redemption offer and the received response.

19. The computer-implemented method of claim 18, wherein the adjusting the reward account of the first individual in accordance with the targeted reward redemption offer and the received response includes:

adjusting, via the processor, at least one of merchandise reward units, service reward units, airline reward units, lodging reward units, gift certificate reward units, and cash reward units.

20. The system of claim 1, wherein determining the probability of acceptance by the identified at least one customer is further based on the determining of whether the respective reward units associated with each customer of the plurality of customers will expire within the predetermined period of time.

* * * * *